US011818011B2

(12) United States Patent
Chau (10) Patent No.: US 11,818,011 B2
(45) Date of Patent: Nov. 14, 2023

(54) USER EXPERIENCE WORKFLOW CONFIGURATION

(71) Applicant: Zoom Video Communications, Inc., San Jose, CA (US)

(72) Inventor: Vi Dinh Chau, Seattle, WA (US)

(73) Assignee: Zoom Video Communications, Inc., San Jose, CA (US)

( * ) Notice: Subject to any disclaimer, the term of this patent is extended or adjusted under 35 U.S.C. 154(b) by 74 days.

(21) Appl. No.: 17/390,715

(22) Filed: Jul. 30, 2021

(65) Prior Publication Data

US 2023/0030849 A1 Feb. 2, 2023

(51) Int. Cl.
| | |
|---|---|
| *G06F 3/048* | (2013.01) |
| *H04L 41/12* | (2022.01) |
| *G06F 3/0481* | (2022.01) |
| *H04M 3/42* | (2006.01) |
| *H04M 3/493* | (2006.01) |

(52) U.S. Cl.
CPC ............ *H04L 41/12* (2013.01); *G06F 3/0481* (2013.01); *H04M 3/4228* (2013.01); *H04M 3/493* (2013.01)

(58) Field of Classification Search
None
See application file for complete search history.

(56) References Cited

U.S. PATENT DOCUMENTS

| | | | |
|---|---|---|---|
| 9,395,959 B2 | 7/2016 | Hatfield et al. | |
| 10,277,733 B1* | 4/2019 | DeMaio | H04M 3/493 |
| 10,380,646 B2 | 8/2019 | Hertel et al. | |
| 10,929,110 B2 | 2/2021 | Huang et al. | |
| 2006/0195817 A1 | 8/2006 | Moon | |
| 2019/0361682 A1* | 11/2019 | Cavalcante | H04M 7/0048 |

OTHER PUBLICATIONS

Decisions Workflow Designer, <https://go.decisions.com/no-code-platform/workflow/visual-designer/>, Jul. 28, 2021, 1 page.
Pipefy, Customized workflows without technical skills, <https://www.pipefy.com/custom-workflows-software/>, Jul. 27, 2021, 3 pages.

* cited by examiner

*Primary Examiner* — William C Trapanese
(74) *Attorney, Agent, or Firm* — Young Basile Hanlon & MacFarlane, P.C.

(57) ABSTRACT

A user experience workflow may be configured based on input received for various object types selectively arranged within the user experience workflow and then bound to a destination identifier, such as a telephone number or web address. A user interface of software for configuring a user experience workflow is presented at a user device and input from that user device is used to selectively arrange objects within a user experience workflow and/or to configure objects thereof. After configurations are applied to the objects, the user experience workflow is bound to the destination identifier. An end user device which accesses the destination identifier (e.g., by calling the telephone number, visiting the web address, or using an application connecting to the web address) may then traverse the user experience workflow, including in some cases having configured content presented thereto.

20 Claims, 7 Drawing Sheets

USER EXPERIENCE WORKFLOW CONFIGURATION

BACKGROUND

Enterprise entities rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location.

SUMMARY

Disclosed herein are, inter alia, implementations of systems and techniques for user experience workflow configuration.

One aspect of this disclosure is a method, which includes presenting objects for configurable arrangement within a user interface output at a device, applying configurations based on input received from the device to a first object of the objects, and binding a user experience workflow arranged within the user interface to include the first object and one or more second objects of the objects to a destination identifier to configure a destination accessed based on the destination identifier to present one or more paths for traversing the first object and the one or more second objects.

Another aspect of this disclosure is an apparatus, which includes a memory and a processor configured to execute instructions stored in the memory to arrange a first object and one or more second objects in a user experience workflow within a user interface output at a device of a user based on first input received from the device, configure the first object based on second input received from the device, and bind the user experience workflow including the configured first object and the one or more second objects to a destination identifier associated with the user to configure a destination accessed based on the destination identifier to present one or more paths for traversing the first object and the one or more second objects.

Yet another aspect of this disclosure is a non-transitory computer readable medium storing instructions operable to cause one or more processors to perform operations, which include applying configurations to a first object arranged with one or more second objects within a user experience workflow based on input received from a device of a user, and binding the user experience workflow including the configured first object and the one or more second objects to a destination identifier associated with the user to configure a destination accessed based on the destination identifier to present one or more paths for traversing the first object and the one or more second objects.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Some UCaaS or other software platforms may allow users to create interactive voice response (IVR) menus as part of a user experience workflow to suit their service needs through various forms. The IVR menu options may be connected with destinations, such as telephony end points, to support multiple pathways for a call depending on selections of IVR menu options by callers. In some cases, a caller who traverses a pathway may be placed in a waiting room either before they are passed along to a desired endpoint from the IVR process or while in a queue (e.g., a list of callers to be addressed by a service agent) awaiting passage thereto. A waiting room may be a node of a call path at which content is presented to the caller. In one example in which an IVR menu is created for a call center, callers may be placed in a waiting room before their calls are enqueued, and content such as an audio message may be presented to the callers in the waiting room.

However, conventional UCaaS and other software platforms do not provide functionality for users to configure a complete user experience workflow defining one or more paths of an end user through a destination, such as a service accessed via dialing a telephone number, a web application accessed by entering a web address within a web browser, or a mobile application accessed by connecting to a web address. In one example, conventional software platforms do not enable users to configure content to present within waiting rooms, arrangements of objects such as waiting rooms within a call path or application path, or otherwise design an entire user experience workflow to be bound to a destination identifier, such as a telephone number or a web address.

As such, platform users must rely upon default options for content selection, which may not always be relevant to the user or which may displace content that the user specifically wishes to present in certain situations. For example, it may be valuable for a platform user in a particular industry to configure a user experience workflow with different electronic forms for an end user to fill out, advertisements for specific services, or end user identification requests. One approach to this problem involves allowing a user to configure certain types of guided output based on input values, such as to programmatically cause specific selections of content. However, this requires the user to type various scripting instructions, which may be beyond the skill or knowledge of many users. Another approach involves the use of a visual workflow editor to design a user experience workflow. However, conventional visual workflow editors are merely for design purposes, meaning that a user would have to find a way to apply a designed user experience workflow to a destination identifier. This not only requires considerable technical skill, but would be very burdensome to maintain where updates need to be made.

Implementations of this disclosure address problems such as these using a visual editor tool for enabling users to configure user experience workflows based on input received for various object types selectively arranged within the user experience workflows and to bind those configured user experience workflows to destination identifiers, such as telephone numbers or web addresses. A user interface of software for configuring a user experience workflow is presented at a user device and input from that user device is used to selectively arrange objects within a user experience workflow and/or to configure objects thereof. After configurations are applied to the objects, the user experience workflow is bound to the destination identifier. An end user device which accesses the destination identifier (e.g., by calling the telephone number, visiting the web address, or using an application connecting to the web address) may then traverse the user experience workflow, including in some cases having configured content presented thereto.

The user experience workflow represents one or more sequences of operations which are performed to present certain communication aspects to an end user when the end user accesses a destination. The user experience workflow is triggered by the end user accessing the destination using a destination identifier, which may be a telephone number where the destination is provided over a telephony service or a web address where the destination is provided using a web application or Internet-connected mobile application. The end user traverses the user experience workflow as it is configured to interact with objects along one or more paths thereof. Examples of those objects include, but are not limited to, queue objects, IVR menu objects, input objects, forwarding objects, media playback objects, voicemail objects, condition objects, and messaging objects. Each of those objects may be configured using input received from a user device. In one example, a media playback object can be configured based on user input specifying a media content item to present, text to present in connection with the media content item, and an action to be performed after the media content item is presented.

The extensible configurability of a user experience workflow according to the implementations of this disclosure enable a user thereof to customize a service accessible through a destination based on the specific needs of that destination. For example, a user experience workflow may be configured according to the implementations of this disclosure to include an IVR menu configured with particular pathway options; forms for input collection before adding a caller/web user to a queue for agent distribution; and/or media playback aspects for presenting media such as images, video, and audio selected based on the subject workflow path or products or services made available by or through the destination. The integration of user experience workflow configuration software as disclosed herein within a UCaaS platform enables the UCaaS platform to easily serve the configured user experience workflow to an end user device which accesses a destination identifier to which the workflow is bound.

Figure 1:
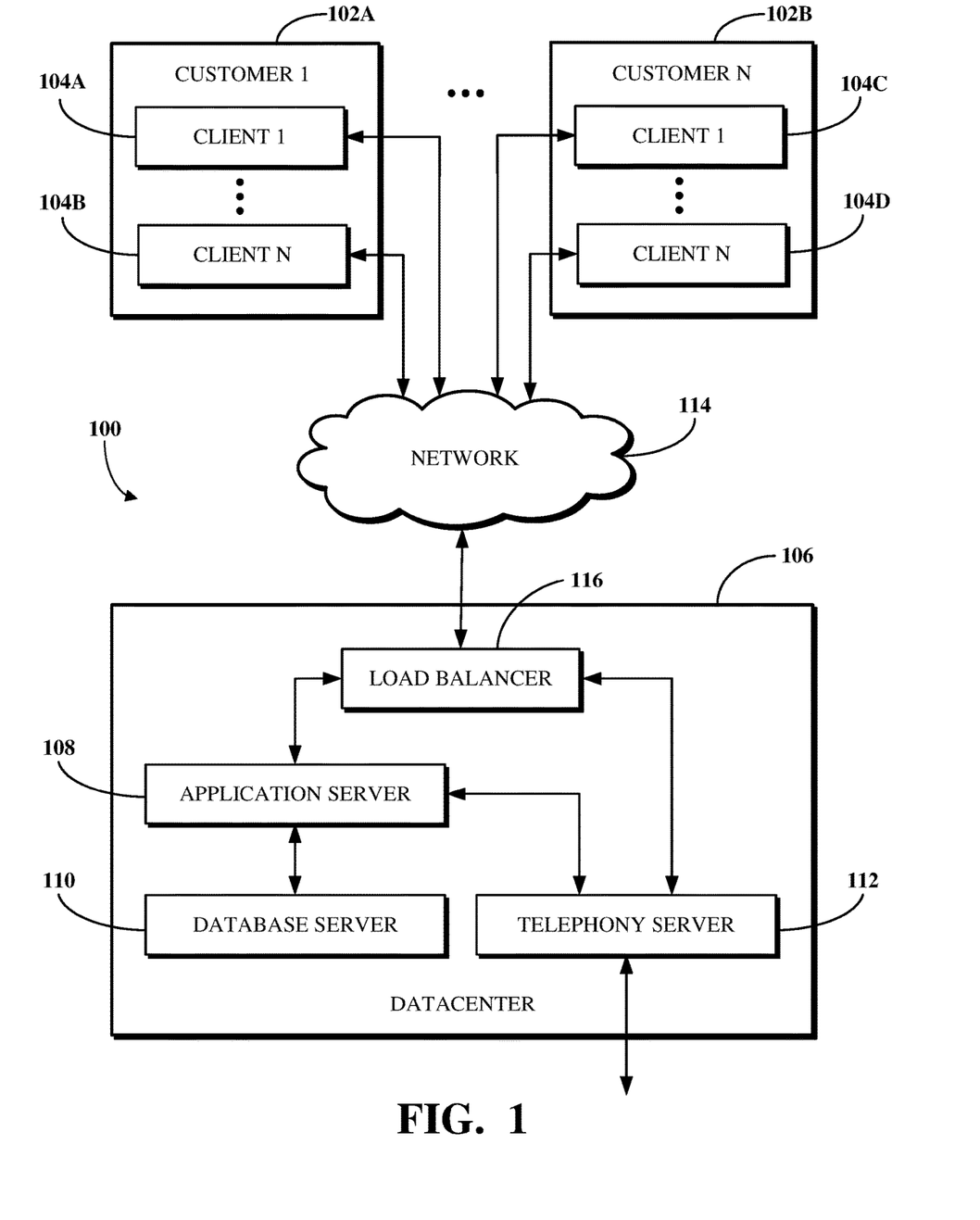
FIG. 1 is a block diagram of an example of an electronic computing and communications system.

To describe some implementations in greater detail, reference is first made to examples of hardware and software structures used to implement a system for user experience workflow configuration. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over Internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
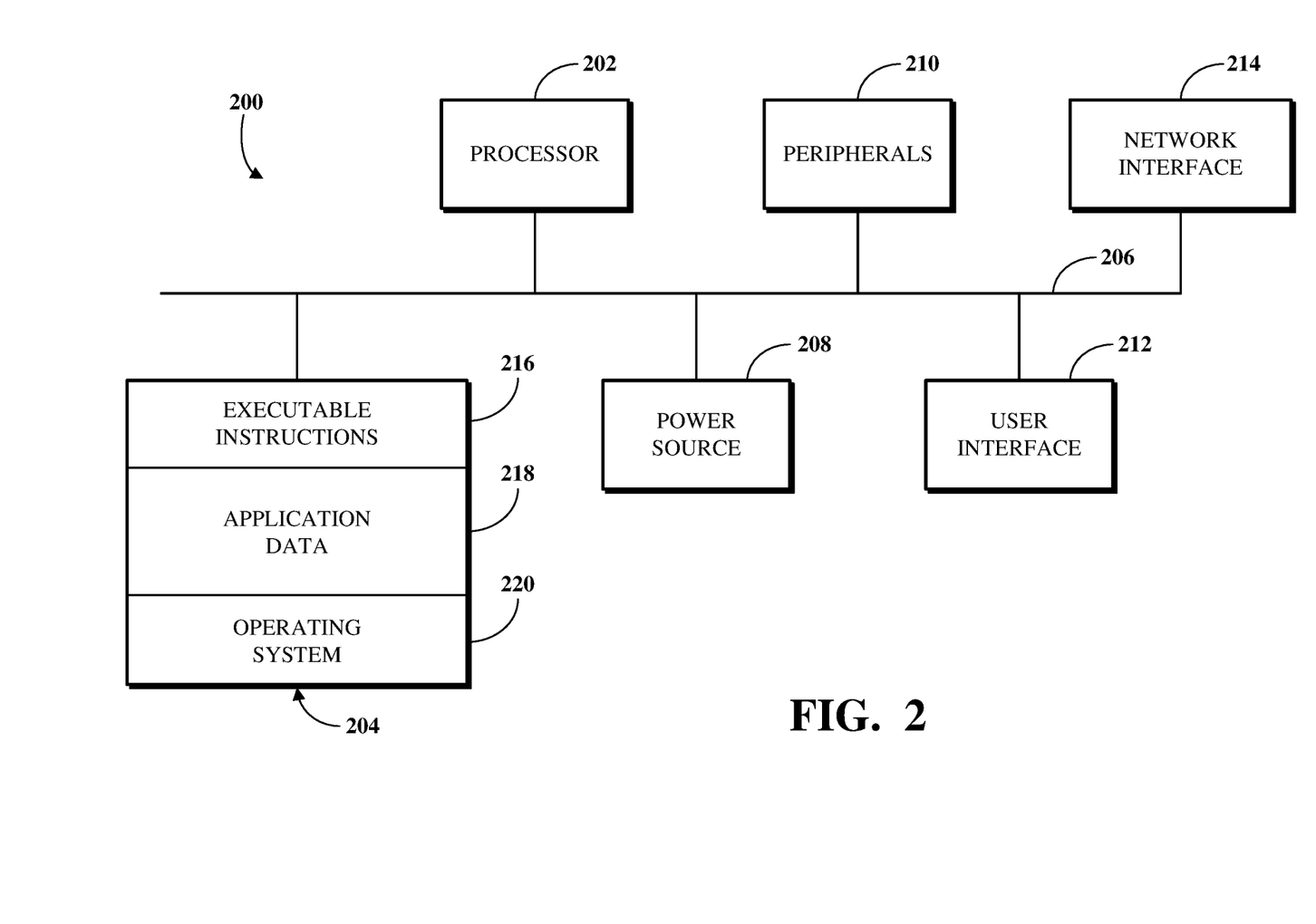
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
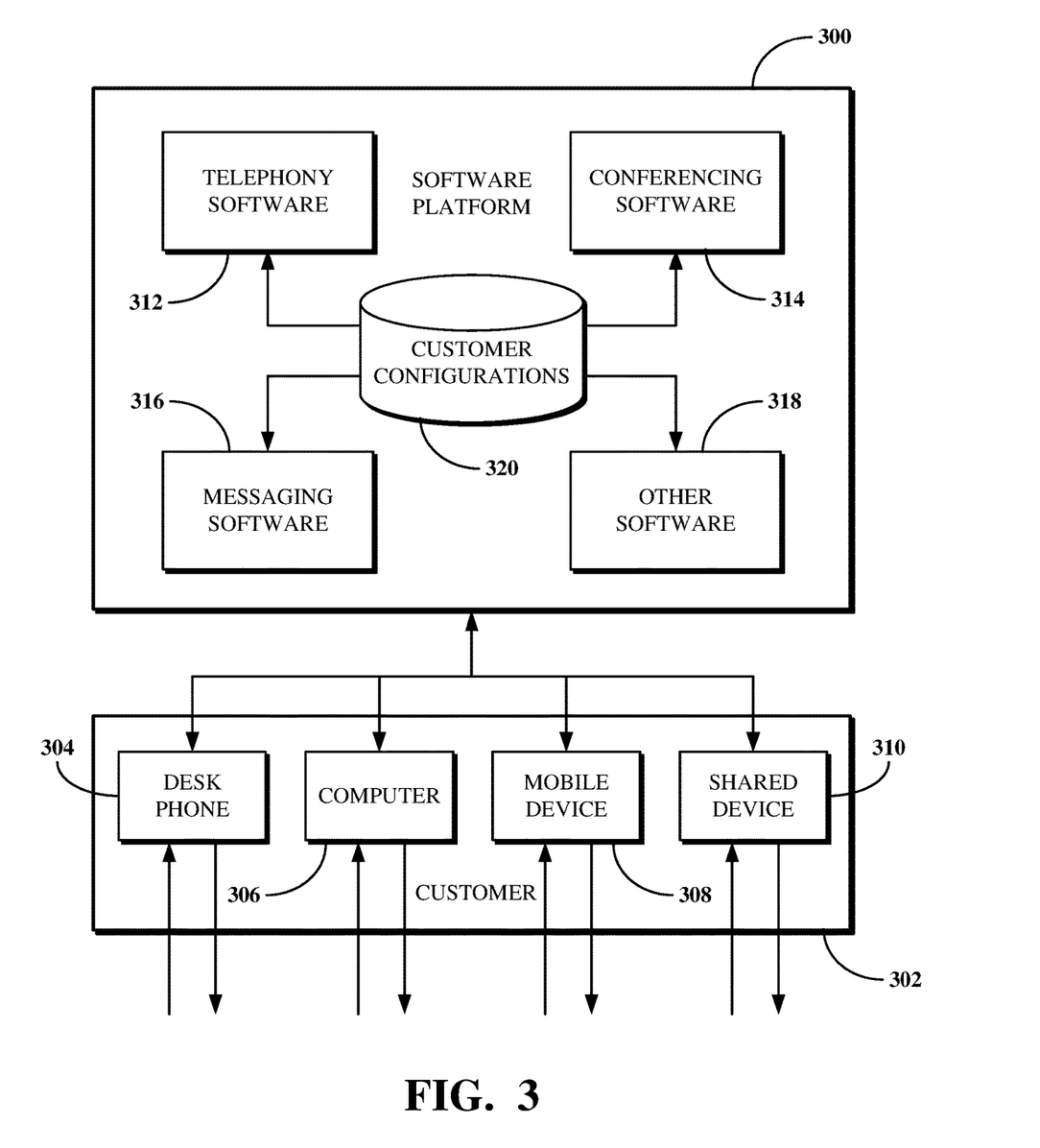
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for configuring user experience workflows and binding those configured user experience workflows to destination identifiers such as telephone numbers or web addresses.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
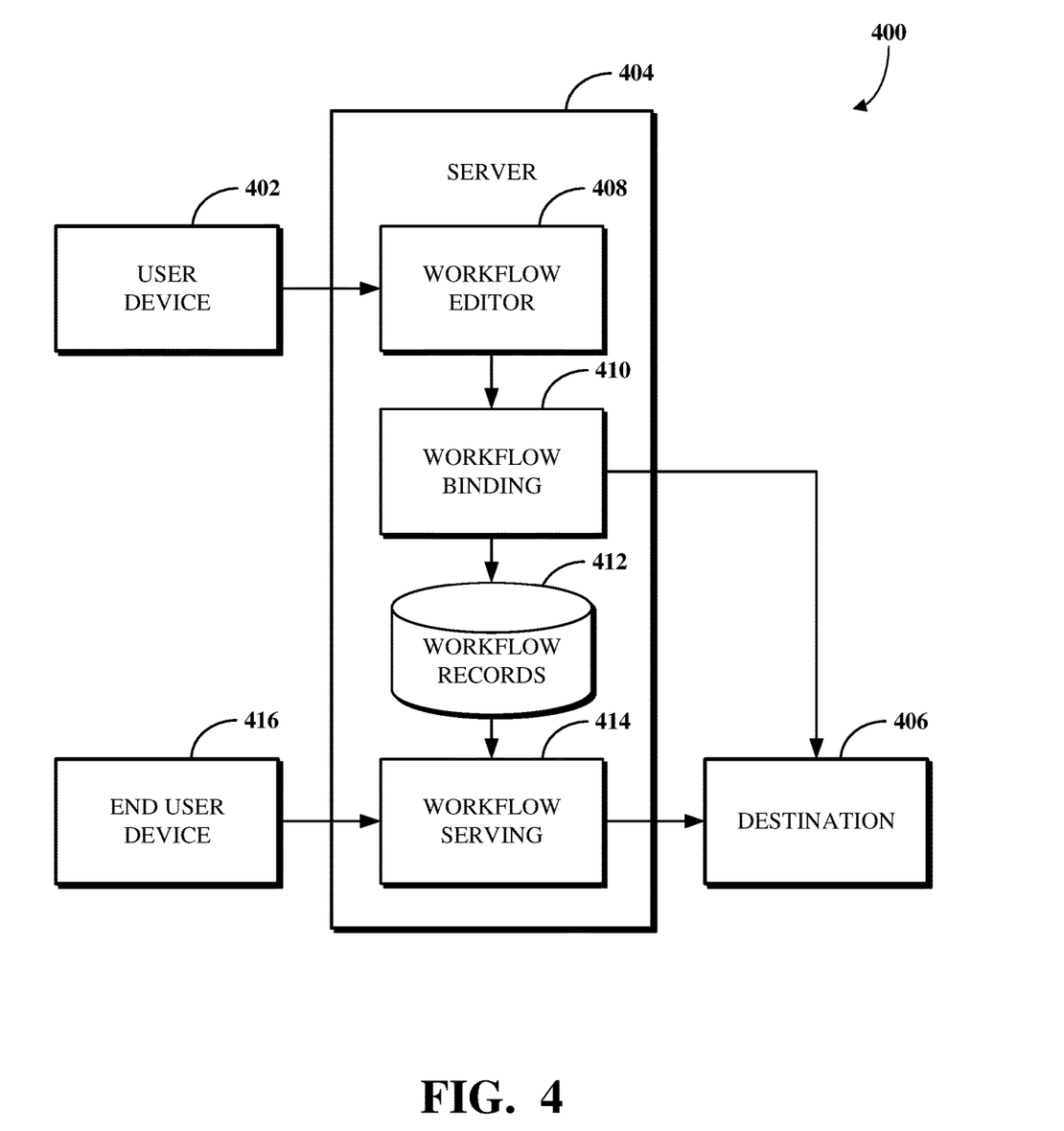
FIG. 4 is a block diagram of an example of a system for user experience workflow configuration.

FIG. 4 is a block diagram of an example of a system 400 for user experience workflow configuration. A user device 402 communicates with a server 404 to configure a user experience workflow to be bound to a destination 406. The user device 402 is a device which includes a display to which a user interface of workflow editor software 408 running at the server 404 may be output. For example, the user device 402 may be a mobile device, such as a laptop, tablet, or mobile phone, or a desktop computer. In some cases, the user device 402 may access the workflow editor 408 using a client application running at the user device 402. The server 404 includes hardware, such as a single computing device or a system of computing devices, configured to implement software and records for user experience workflow configuration and binding, including the workflow editor software 408, workflow binding software 410, a workflow records data store 412, and workflow serving software 414. The destination 406 is or refers to one or more phone devices, computing devices, network elements, and/or the like reachable by dialing a telephone number or accessing a web address associated therewith. In particular, once a user experience workflow is configured and bound to a destination identifier associated with the destination 406, the user experience workflow may be accessed by an end user device 416 accessing the destination 406 based on the destination identifier. The user experience workflow includes objects arranged to present one or more paths for a telephone call, web application process, or mobile application process, which may in some cases ultimately direct the end user to a telephone call or video conference with someone associated with the destination.

The workflow editor software 408 is user-facing software which includes a user interface for configuring a user experience workflow. The user interface of the workflow editor software 408 includes a canvas for designing the user experience workflow, an object frame which includes a list of objects which may be selectively arranged within the canvas, and a configuration frame for receiving input used to configure the objects within the canvas. The canvas may by default be blank so as to allow the operator of the user device 402 to configure a user experience workflow from scratch. However, in some cases, one or more user experience workflow templates may be provided based on a type of workflow to configure. The list of objects includes queue objects, IVR menu objects, input objects, forwarding objects, media playback objects, voicemail objects, condition objects, and messaging objects. In some cases, the list of objects may be extensible, such as by allowing a user to input scripting instructions or make application programming interface (API) calls to external programs. The fields available within the configuration frame may change on an object type-basis. For example, the types of configurations which may be made for a media playback object may be different from those which may be made for an IVR menu object.

The size of the canvas within the user interface of the workflow editor software 408 may be extensible to enable potentially large arrangements of objects and lengthy pathways. However, in some implementations, the workflow editor software 408 may include functionality for alerting an operator of the user device 402 when a user experience workflow configured therein becomes too lengthy. For example, the workflow editor software 408 may calculate estimated times it would take a caller or web visitor to traverse a path and warn the operator of the user device 402 where such an estimated time exceeds a threshold. In particular, where the estimated time exceeds a threshold, the workflow editor software 408 may suggest that the operator of the user device 402 shorten one or more paths of the user experience workflow, such as to avoid caller/web visitor frustration. In some such implementations, the estimated times may be calculated for each object in a path based on a presumed average time traversal such objects take and then those estimated times may be summed.

The workflow binding software 410 is non-user-facing software and performs operations for binding a user experience workflow configured using the workflow editor software 408 to a destination identifier, such as a telephone number or web address. The destination identifier may be obtained from the workflow editor software 408. For example, the operator of the user device 402 may specify the destination identifier when configuring the user experience workflow. The manner by which the workflow binding software 410 binds the user experience workflow to the destination identifier depends upon the destination identifier. Where the destination identifier is a telephone number, the workflow binding software 410 binds the user experience workflow to the telephone number by creating a telephony routing rule that routes calls to the destination identifier through the user experience workflow. Where the destination identifier is a web address, the workflow binding software 410 binds the user experience workflow to the web address either by embedding scripting instructions within a website associated with the web address to cause an invocation of the user experience workflow or by pushing the user experience workflow to a software development kit (SDK) embedded within a mobile application that accesses a website associated with the web address.

The workflow records data store 412 stores data representative of user experience workflows which have been bound to destination identifiers. The workflow records data store 412 may be a database, repository, or other data store structure configured to interface with one or more software aspects at the server 404. A user experience workflow may be stored in the workflow records data store 412 in response to being bound to a destination identifier. For example, the binding of the user experience workflow to the destination identifier may represent a final step in the process for publishing the user experience workflow for traversal by an end user, such as an operator of the end user device 416.

The workflow serving software 414 serves the user experience workflow to the end user device 416 based on the end user device transmitting a request for the destination identifier to which the user experience workflow is bound. The request for the destination identifier may be or otherwise refer to a telephone number being dialed at the end user device 416, a web address associated with a web application being accessed within a web browser at the end user device 416, or a web address being accessed by a mobile application running at the end user device 416. The workflow serving software 414 is configured to receive requests for the destination identifier and access data representative of the user experience workflow stored within the workflow records data store 412 in response to those requests. Once the user experience workflow data is accessed, the end user device 416 is connected to the destination 406 and the user experience workflow is served to the end user device 416.

The main communication modalities addressed by the system 400 as described above are telephony services, web applications, and mobile applications. However, in some implementations, the system 400 may extend in at least some cases to other modalities, such as chat. For example, the workflow editor software 408 may be used to create a user experience workflow for a chat process, such as by defining a chat menu and paths which lead to various stages at which content is presented, requests are queued while awaiting agent service, and so on. In such a case, a configured user experience workflow may be bound to a chat service accessed through a mobile application or a web application.

Although the workflow editor software 408, the workflow binding software 410, the workflow records data store 412, and the workflow serving software 414 are all shown as being at the server 404, in some implementations, one or more of those aspects may be external to the server 404. For example, the workflow records data store 412 and/or the workflow serving software 414 may be implemented at one or more servers separate from the server 404.

Figure 5:
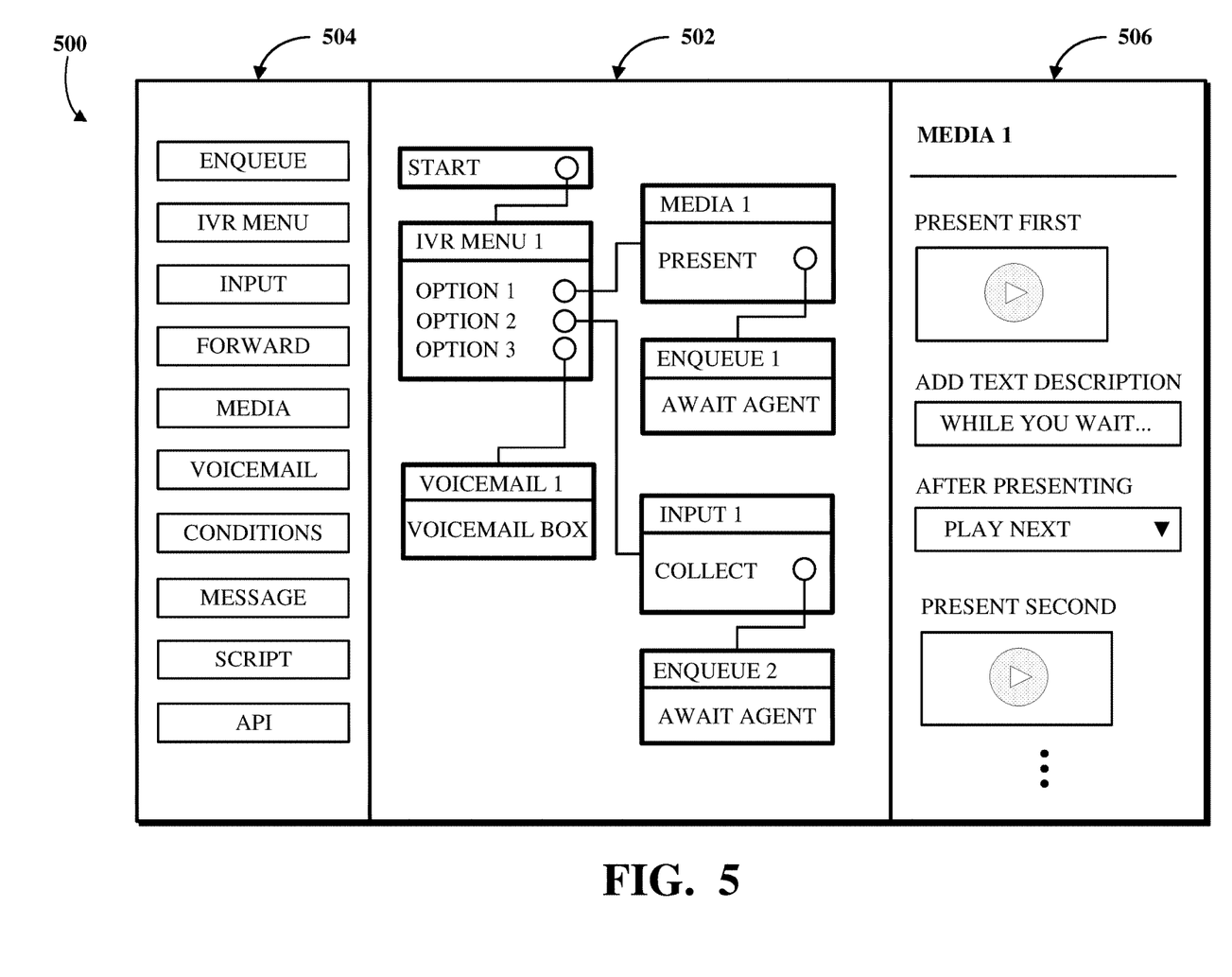
FIG. 5 is an illustration of an example of a user interface of software for configuring a user experience workflow.

FIG. 5 is an illustration of an example of a user interface 500 of software for configuring a user experience workflow, such as the workflow editor software 408 shown in FIG. 4. The user interface 500 includes a canvas 502 within which a user experience workflow is configured, an object frame 504 from which various objects may be selected for arrangement within the canvas 502, and a configuration frame 506 within which configurations may be applied to objects arranged within the canvas 502. A user, such as an operator of the user device 402 shown in FIG. 4, may select various objects from the object frame 504 to include in the canvas 502. For example, the user may drag and drop objects from the object frame 504 to the canvas 502. The user may arrange the objects within the canvas by connecting them to create a flow of one or more paths beginning with a starting object. Multiple paths are shown from the IVR Menu 1 object in the canvas 502. In at least some cases, those paths may end with the end user interacting with another person, such as over a voice or video service.

The user may interact with an object within the canvas 502, such as by clicking on it using a mouse or through a touch interface, to cause the configuration frame 506 to present configuration options for the object. The configuration options presented are based on the object type of the selected object. As shown, the configuration frame 506 includes configuration options for the media playback object labeled Media 1 in the canvas 502. The configuration options include an option to select a first media content item to present at the Media 1 object, an option to add a text description which accompanies the presentation of the first media content item, an option to indicate an action to perform after the first media item is presented, and an option to select a second media content item to present at the Media 1 object after the presentation of the first media content item. The configurations made within the configuration frame 506 based on input received from the user device are applied to the Media 1 object, which causes the Media 1 object to present media according to those configurations when the user experience workflow is traversed by an end user device.

Figure 6:
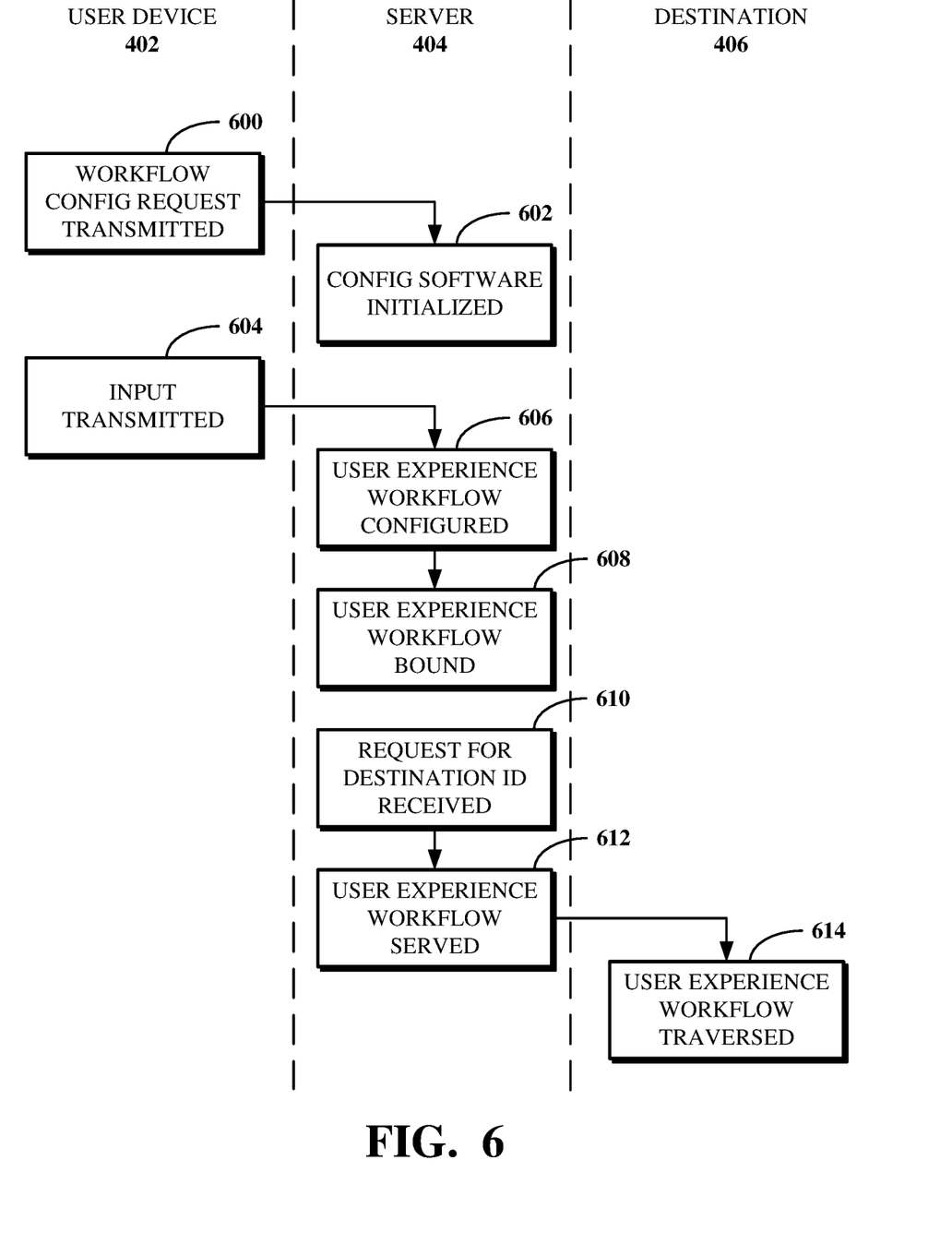
FIG. 6 is an illustration of swim lanes showing an example sequence of operations performed for configuring a user experience workflow and binding it to a telephone number.

FIG. 6 is an illustration of swim lanes showing an example sequence of operations performed for configuring a user experience workflow and binding it to a destination identifier. The sequence of operations is between the user device 402, the server 404, and the destination 406 shown in FIG. 4. At 600, a request for user experience workflow configuration is transmitted from the user device 402 to the server 404. At 602, based on the request received from the user device 402, software for configuring a user experience workflow is initialized at the server 602. Thereafter, at 604, input is transmitted from the user device 402 to the server 404. At 606, the user experience workflow is configured at the server 404 based on the input received from the user device 402. For example, the input may be to arrange one or more objects within the user experience workflow and/or to configure one or more such objects. The operations at 604 and 606 may repeat while there is further input to process.

At 608, after the configurations to the user experience workflow have been completed, the user experience workflow is bound to a destination identifier used to access a destination. Later, at 610, a request for the destination identifier is received at the server 404 from an end user device. For example, the request may be based on a call to a telephone number from the end user device, a web browser request to a web address at the end user device, or a mobile application request to a web address from the end user device. At 612, the user experience workflow bound to the destination identifier is served (e.g., the user experience workflow is presented to the end user device). At 614, the user experience workflow is traversed at the destination 406, such as by the end user device stepping through the objects of the user experience workflow.

Figure 7:
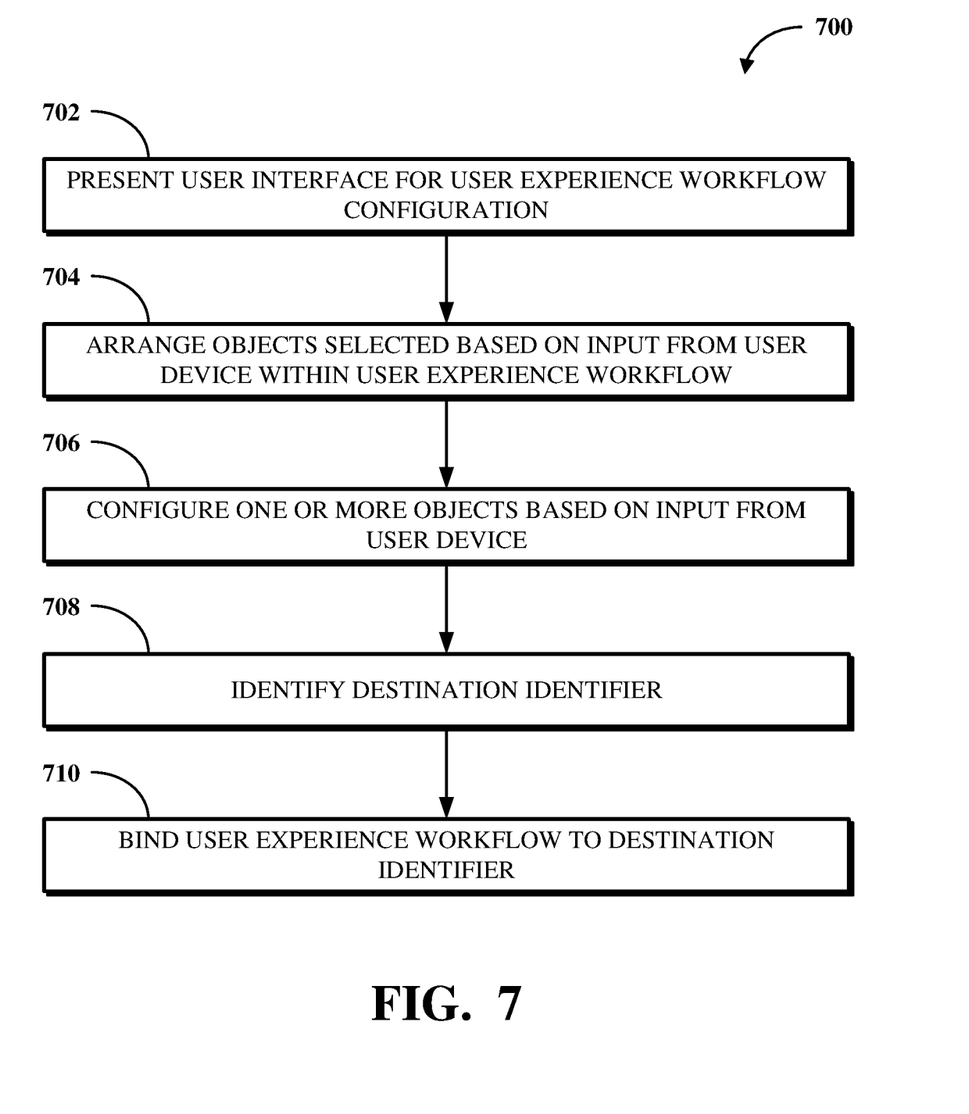
FIG. 7 is a flowchart of an example of a technique for user experience workflow configuration.

To further describe some implementations in greater detail, reference is next made to examples of techniques which may be performed by or using a system for user experience workflow configuration. FIG. 7 is a flowchart of an example of a technique 700 for user experience workflow configuration. The technique 700 can be executed using computing devices, such as the systems, hardware, and software described with respect to FIGS. 1-6. The technique 700 can be performed, for example, by executing a machine-readable program or other computer-executable instructions, such as routines, instructions, programs, or other code. The steps, or operations, of the technique 700 or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, a user interface for user experience workflow configuration is presented to a device of a user. The user interface is of software for user experience workflow configuration. The user interface is presented to the device of the user in response to the device accessing the software, such as at a server. For example, the software may be accessed via a client application, a non-client mobile application, or a website.

At 704, objects selected based on input from the device of the user are arranged within the user experience workflow. The input from the device indicates selections of objects such as from a list of objects available for user experience workflow configuration and/or an arrangement of objects within the user experience workflow. The list of objects may, for example, include queue objects, IVR menu objects, input objects, forwarding objects, media playback objects, voicemail objects, condition objects, and messaging objects. For example, certain objects, such as forwarding objects, may connect the end user traversing the user experience workflow to another person over a voice (e.g., telephony) or video (e.g., conference) communication service.

At 706, one or more of the objects arranged within the user experience workflow are configured based on input received from the device of the user. The input from the device specifies the configurations to apply to the respective objects. The objects correspond to one or more object types. The types of configurations which may be applied to the respective objects are based on the types of those objects. For example, the configurations applied to a media playback type object may identify a media content item to present at a node associated with that object within the user experience workflow. In another example, an IVR object may be configured to direct a call to the telephone number to the one or more call paths. The objects are configured after they are arranged in the user experience workflow. However, in some implementations, an object may be configured before it is arranged within the user experience workflow, such as within an object frame of the user interface.

At 708, a destination identifier to which to bind the configured user experience workflow is identified. The destination identifier is a telephone number or a web address. The destination identifier can be identified based on input received from a user of the device from which the input used to configure the user experience workflow was received. In some implementations, the destination identifier may be identified before the user experience workflow is configured.

At 710, the configured user experience workflow is bound to a destination identifier. Binding the user experience workflow to the destination identifier causes the user experience workflow to be served to an end user device which accesses a destination associated with the destination identifier. The user of the software for configuring the user experience workflow may be associated with the destination identifier. For example, the destination identifier may be a telephone number or web address associated with a company of which the user is an employee, contractor, owner, or the like.

In some implementations, changes to the user experience workflow can be received and applied to dynamically adjust the content presented in, objects arranged in, and/or paths of the user experience workflow. For example, a user of the operator device which is used to configure the user experience workflow may edit the user experience workflow after it has been published for traversal by end users. The edits may pertain to configurations for objects (e.g., types of content which are presented at certain media playback objects), arrangements of objects (e.g., by rearranging objects in a path), and/or arrangements of paths (e.g., by adding, removing, or changing paths) that the end user may select to traverse. In some such cases, the changes may be immediately applied while an end user is traversing the user experience workflow. For example, where the change is to content presented at the node at which the end user is when the changes are applied, the previously configured content may be stopped and the new content may begin at the node.

Thus, where the destination identifier is a telephone number, the user experience workflow is generated to include one or more call paths accessed based on the telephone number. The call paths include nodes corresponding to the objects selectively arranged and configured in the user experience workflow. For example, one of the call paths may include a node configured to present audio content based on some configurations during a phone call to the telephone number. Similarly, where destination identifier is a web address, the user experience workflow is generated to include one or more web application paths accessed based on the web address. The web application paths include nodes corresponding to the objects selectively arranged and configured in the user experience workflow. For example, one of the web application paths may include a node configured to present visual (e.g., image or video) content based on some configurations during an access of a web application at the web address.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    presenting objects for configurable arrangement within a user interface output at a device;
    applying configurations based on input received from the device to a first object of the objects; and
    binding a user experience workflow arranged within the user interface to include the first object and one or more second objects of the objects to a destination identifier to configure a destination accessed based on the destination identifier to present one or more paths for traversing the first object and the one or more second objects,
    wherein the first object is a media playback object configured, according to the configurations, to present visual content to an end user device during a traversal of the user experience workflow by the end user device.

2. The method of claim 1, wherein the destination identifier is a telephone number and the one or more paths are one or more call paths, the method comprising:
    generating the user experience workflow to include the one or more call paths accessed based on the telephone number.

3. The method of claim 2, wherein at least one call path of the one or more call paths includes a node corresponding to the first object and configured to present audio content based on the configurations.

4. The method of claim 1, wherein the destination identifier is a web address and the one or more paths are one or more application paths, the method comprising:
    generating the user experience workflow to include one or more application paths accessed based on the web address.

5. The method of claim 4, wherein at least one application path of the one or more application paths includes a node corresponding to the first object and configured to present the visual content based on the configurations.

6. The method of claim 1, wherein the objects correspond to one or more object types and the configurations applied to the first object are based on an object type of the first object.

7. The method of claim 6, wherein the object type of the first object is a media playback object type and the configurations applied to the first object identify a media content item to present at a node associated with the first object within the user experience workflow.

8. An apparatus, comprising:
    a memory; and
    a processor configured to execute instructions stored in the memory to:
        arrange a first object and one or more second objects in a user experience workflow within a user interface output at a device of a user based on first input received from the device;
        configure the first object based on second input received from the device; and
        bind the user experience workflow including the configured first object and the one or more second objects to a destination identifier associated with the user to configure a destination accessed based on the destination identifier to present one or more paths for traversing the first object and the one or more second objects,
    wherein the first object is a media playback object configured, according to the configurations, to present visual content to an end user device during a traversal of the user experience workflow by the end user device.

9. The apparatus of claim 8, wherein the second input identifies a media content item to present at a node associated with the first object within the user experience workflow.

10. The apparatus of claim 9, wherein the one or more paths are one or more call paths, and wherein the destination identifier is a telephone number and the node is accessed within one or more call paths based on the telephone number.

11. The apparatus of claim 10, wherein one of the second objects is configured as an interactive voice response object to direct a call to the telephone number to the one or more call paths.

12. The apparatus of claim 9, wherein the one or more paths are one or more application paths, and wherein the destination identifier is a web address and the node is accessed within the one or more application paths accessed based on the web address.

13. The apparatus of claim 12, wherein one of the second objects is configured as an input object to receive input from an end user device at the web address.

14. The apparatus of claim 8, the one or more second objects are selectable within a user interface presented to the device.

15. A non-transitory computer readable medium storing instructions operable to cause one or more processors to perform operations comprising:
- applying configurations to a first object arranged with one or more second objects within a user experience workflow based on input received from a device of a user; and
- binding the user experience workflow including the configured first object and the one or more second objects to a destination identifier associated with the user to configure a destination accessed based on the destination identifier to present one or more paths for traversing the first object and the one or more second objects, wherein the first object is a media playback object configured, according to the configurations, to present visual content to an end user device during a traversal of the user experience workflow by the end user device.

16. The non-transitory computer readable medium of claim 15, wherein the one or more paths are one or more call paths, and wherein the destination identifier is a telephone number and a node associated with the first object within the user experience workflow is accessed within one or more call paths based on the telephone number.

17. The non-transitory computer readable medium of claim 16, wherein the configurations identify an audio content item to present at the node.

18. The non-transitory computer readable medium of claim 15, wherein the one or more paths are one or more application paths, and wherein the destination identifier is a web address and a node associated with the first object within the user experience workflow is accessed within the one or more application paths based on the web address.

19. The non-transitory computer readable medium of claim 18, wherein the configurations to indicate to present the visual content at the node.

20. The non-transitory computer readable medium of claim 15, the one or more second objects include one or more of a queue object, an interactive voice response menu object, an input object, a forwarding object, a media playback object, a voicemail object, a condition object, or a messaging object.

* * * * *